United States Patent
Lee et al.

(10) Patent No.: US 11,233,279 B2
(45) Date of Patent: Jan. 25, 2022

(54) BATTERY PACK

(71) Applicant: Samsung SDI Co., Ltd., Yongin-si (KR)

(72) Inventors: Eunjoong Lee, Yongin-si (KR); Miae Um, Yongin-si (KR); Daehyeong Yoo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 176 days.

(21) Appl. No.: 16/193,165

(22) Filed: Nov. 16, 2018

(65) Prior Publication Data
US 2019/0173134 A1 Jun. 6, 2019

(30) Foreign Application Priority Data
Dec. 4, 2017 (KR) .......................... 10-2017-0165228

(51) Int. Cl.
| *H01M 10/42* | (2006.01) |
| *H01M 10/48* | (2006.01) |
| *H01M 50/20* | (2021.01) |
| *H01M 50/183* | (2021.01) |
| *H01M 50/543* | (2021.01) |
| *H01M 50/557* | (2021.01) |

(52) U.S. Cl.
CPC ..... *H01M 10/4257* (2013.01); *H01M 10/425* (2013.01); *H01M 10/482* (2013.01); *H01M 50/183* (2021.01); *H01M 50/20* (2021.01); *H01M 50/543* (2021.01); *H01M 50/557* (2021.01); *H01M 2010/4271* (2013.01)

(58) Field of Classification Search
None
See application file for complete search history.

(56) References Cited

U.S. PATENT DOCUMENTS

| 8,822,068 B2 | 9/2014 | Hwang et al. | |
| 2015/0064502 A1* | 3/2015 | Hong | H01M 2/0207 429/7 |
| 2015/0357689 A1* | 12/2015 | Park | H01M 2/0212 429/120 |

FOREIGN PATENT DOCUMENTS

| KR | 10-2005-0036466 A | 4/2005 |
| KR | 10-0922742 B1 | 10/2009 |
| KR | 10-2016-0041402 A | 4/2016 |

* cited by examiner

*Primary Examiner* — Carmen V Lyles-Irving
(74) *Attorney, Agent, or Firm* — Knobbe, Martens, Olson & Bear, LLP (57) ABSTRACT

A battery pack includes a battery cell and a protection circuit module. The battery cell includes i) an electrode assembly to which an electrode tab is connected and ii) first and second cases coupled to face each other to form an accommodating portion accommodating the electrode assembly and a sealing portion sealing the accommodating portion. The sealing portion includes i) a terrace portion extending across the electrode tab and comprising a first surface on a first case side and a second surface on a second case side and ii) a side sealing portion including an end contacting the terrace portion and an extension extending from the end. The protection circuit module is arranged on the first or second surface of the terrace portion. The end of the side sealing portion is folded in such a way not to spatially interfere with the protection circuit module.

21 Claims, 6 Drawing Sheets

(Prior Art)

BATTERY PACK

CROSS-REFERENCE TO RELATED APPLICATION

This application claims the benefit of Korean Patent Application No. 10-2017-0165228, filed on Dec. 4, 2017, in the Korean Intellectual Property Office, the disclosure of which is incorporated herein in its entirety by reference.

BACKGROUND

Field

The described technology generally relates to battery packs.

Description of the Related Technology

In general, secondary batteries are rechargeable. Secondary batteries can be used as energy sources for mobile devices, electric vehicles, hybrid vehicles, electric bicycles, uninterruptible power supplies, or the like. Depending on the types of external devices to which they are applied, the secondary batteries can be used in the form of a single battery cell or in the form of a battery pack in which a number of battery cells are combined into one housing.

A small mobile device, such as a mobile phone, is designed to operate for a certain period of time according to the output and capacity of a single battery. However, in the case of long-time driving or high-power driving such as an electric vehicle or a hybrid vehicle with high power consumption, a battery pack may be preferred due to output and capacity issues. The battery pack can increase the output voltage or the output current according to the number of built-in battery cells.

The battery pack generally includes a protection circuit module for collecting state information of the battery cells such as voltage/temperature of the battery cells and controlling charge/discharge operations of the battery cells, in order to detect malfunctions of the battery cells and take protective actions.

SUMMARY

One inventive aspect is a battery pack that includes a battery cell having a sealing portion for sealing an electrode assembly and a protection circuit module forming a charge/discharge path of the battery cell and is suitable for compactness while preventing a spatial interference between the protection circuit module and the sealing portion of the battery cell.

Additional aspects will be set forth in part in the description which follows and, in part, will be apparent from the description, or may be learned by practice of the presented embodiments.

Another aspect is a battery pack comprising a battery cell and a protection circuit module, wherein the battery cell comprises: i) an electrode assembly to which an electrode tab is connected; and ii) first and second cases coupled to face each other to form an accommodating portion accommodating the electrode assembly and a sealing portion sealing the accommodating portion, wherein the sealing portion comprises: i)) a terrace portion extending across the electrode tab and comprising a first surface on a first case side and a second surface on a second case side; and ii)) a side sealing portion comprising an end portion contacting the terrace portion and an extension portion extending from the end portion, wherein the end portion of the side sealing portion is folded to overlap onto the second surface of the terrace portion or folded to protrude in a second surface direction of the terrace portion; and the protection circuit module is arranged on the first surface of the terrace portion.

For example, the end portion of the side sealing portion may be folded to protrude in the second surface direction that is a facing direction of the second surface of the terrace portion.

For example, the end portion of the side sealing portion may be folded to protrude in the second surface direction that is the facing direction of the second surface of the terrace portion, and may not overlap onto the second surface of the terrace portion.

For example, the end portion and the extension portion of the side sealing portion may be folded in parallel to protrude in the second surface direction of the terrace portion.

For example, the end portion of the side sealing portion may be folded concavely toward an edge where the second surface of the terrace portion and the accommodating portion contact each other to overlap onto the second surface of the terrace portion and the accommodating portion.

For example, the end portion and the extension portion of the side sealing portion may be folded to overlap onto different side portions of the accommodating portion.

For example, the end portion of the side sealing portion may not overlap onto the first surface of the terrace portion where the protection circuit module is arranged, or may not protrude in a first surface direction.

For example, the first and second cases may respectively include first and second accommodating portions accommodating different portions of the electrode assembly.

For example, a thickness of the first accommodating portion may be greater than a thickness of the second accommodating portion.

For example, the battery cell may include a plurality of battery cells, and the protection circuit module may extend across the plurality of battery cells and form an electrical connection with each of the plurality of battery cells.

For example, the protection circuit module may extend along a terrace portion of the plurality of battery cells and form an electrical connection with an electrode tab drawn from a terrace portion of each of the plurality of battery cells.

For example, the electrode tab may include first and second electrode tabs having different polarities, and the first and second electrode tabs may be drawn from the terrace portion and connected to the protection circuit module.

For example, the protection circuit module may include first and second connection tabs that are coupled to respectively overlap with the first and second electrode tabs drawn from the terrace portion and are exposed outside through a coupling hole.

For example, the protection circuit module may include a transverse portion extending across a side sealing portion of different battery cells, and a side surface of the transverse portion facing an accommodating portion of different battery cells may include a flat surface.

For example, a mounting hole configured to mount a current interrupting device may be formed in a side surface of the protection circuit module facing an accommodating portion of the battery cell.

For example, the mounting hole may be formed at a position between the first and second electrode tabs, inclusive of a position of the first and second electrode tabs.

For example, the current interrupting device may include a main body and first and second leads connected to each other through the main body, and the main body may be accommodated in the mounting hole.

For example, the current interrupting device may be connected to a charge/discharge path of the battery cell to limit or interrupt the charge/discharge path when the battery cell malfunctions.

Another aspect is a battery pack comprising a battery cell and a protection circuit module, wherein the battery cell comprises: an electrode assembly to which an electrode tab is connected; and first and second cases coupled to face each other to form an accommodating portion accommodating the electrode assembly and a sealing portion sealing the accommodating portion, wherein the sealing portion comprises: a terrace portion extending across the electrode tab and comprising a first surface on the first case and a second surface on the second case; and a side sealing portion comprising an end portion contacting the terrace portion and an extension portion connected to and extending away from the end portion, wherein the end portion of the side sealing portion is folded to overlap the second surface of the terrace portion or folded to protrude in a second surface direction of the terrace portion, and wherein the protection circuit module is arranged on the first surface of the terrace portion.

In the above battery pack, the end portion of the side sealing portion is folded to protrude in the second surface direction that is a facing direction of the second surface of the terrace portion. In the above battery pack, the end portion of the side sealing portion is folded to protrude in the second surface direction so as not to overlap the second surface of the terrace portion. In the above battery pack, the end portion and the extension portion of the side sealing portion are folded substantially in parallel to protrude in the second surface direction of the terrace portion. In the above battery pack, the end portion of the side sealing portion is folded concavely toward an edge where the second surface of the terrace portion and the accommodating portion contact each other to overlap the second surface of the terrace portion and the accommodating portion.

In the above battery pack, the end portion and the extension portion of the side sealing portion are folded to overlap different side portions of the accommodating portion. In the above battery pack, the end portion of the side sealing portion does not overlap the first surface of the terrace portion where the protection circuit module is arranged or protrude in a first surface direction. In the above battery pack, the first and second cases respectively comprise first and second accommodating portions respectively accommodating upper and lower portions of the electrode assembly. In the above battery pack, the first accommodating portion is thicker than the second accommodating portion. In the above battery pack, the battery cell comprises a plurality of battery cells, and wherein the protection circuit module extends across the plurality of battery cells and forms an electrical connection with each of the plurality of battery cells.

In the above battery pack, the protection circuit module extends along a terrace portion of the plurality of battery cells and forms an electrical connection with an electrode tab drawn from a terrace portion of each of the plurality of battery cells. In the above battery pack, the electrode tab comprises first and second electrode tabs having different polarities, and wherein the first and second electrode tabs are drawn from the terrace portion and connected to the protection circuit module. In the above battery pack, the protection circuit module comprises first and second connection tabs that are coupled to respectively overlap the first and second electrode tabs drawn from the terrace portion and are exposed outside the protection circuit module through a coupling hole. In the above battery pack, the protection circuit module comprises a transverse portion extending across a side sealing portion of different battery cells, and wherein a side surface of the transverse portion facing an accommodating portion of different battery cells comprises a flat surface.

In the above battery pack, a mounting hole configured to mount a current interrupting device is formed in a side surface of the protection circuit module facing an accommodating portion of the battery cell. In the above battery pack, the mounting hole is formed at a position between the first and second electrode tabs, inclusive of a position of the first and second electrode tabs. In the above battery pack, the current interrupting device comprises a main body and first and second leads connected to each other through the main body, and wherein the main body is accommodated in the mounting hole. In the above battery pack, the current interrupting device is connected to a charge/discharge path of the battery cell to limit or interrupt the charge/discharge path when the battery cell malfunctions.

Another aspect is a battery pack comprising: a battery cell; and a protection circuit module configured to control charge/discharge operations of the battery cell, wherein the battery cell comprises: an electrode assembly; an electrode tab outwardly extending in a first direction from the electrode assembly; and first and second half cases coupled to each other to form a case, wherein the case includes an accommodating space accommodating the electrode assembly and a sealing portion outwardly extending from and sealing the accommodating space, wherein the sealing portion comprises: a terrace portion extending in a second direction crossing the first direction and comprising a first surface on the first half case and a second surface on the second half case; and a side sealing portion comprising an end contacting the terrace portion and an extension connected to and extending away from the end, wherein the protection circuit module is arranged on the first or second surface of the terrace portion, and wherein the end of the side sealing portion is folded so as not to spatially interfere with the protection circuit module.

In the above battery pack, the end of the side sealing portion is folded to overlap one of the second or first surface of the terrace portion where the protection circuit module is not arranged or folded to protrude in a direction toward one of the second or first half case where the protection circuit module is not arranged.

BRIEF DESCRIPTION OF THE DRAWINGS

These and/or other aspects will become apparent and more readily appreciated from the following description of the embodiments, taken in conjunction with the accompanying drawings.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Hereinafter, battery packs according to embodiments of the present disclosure will be described with reference to the accompanying drawings.

Figure 1:
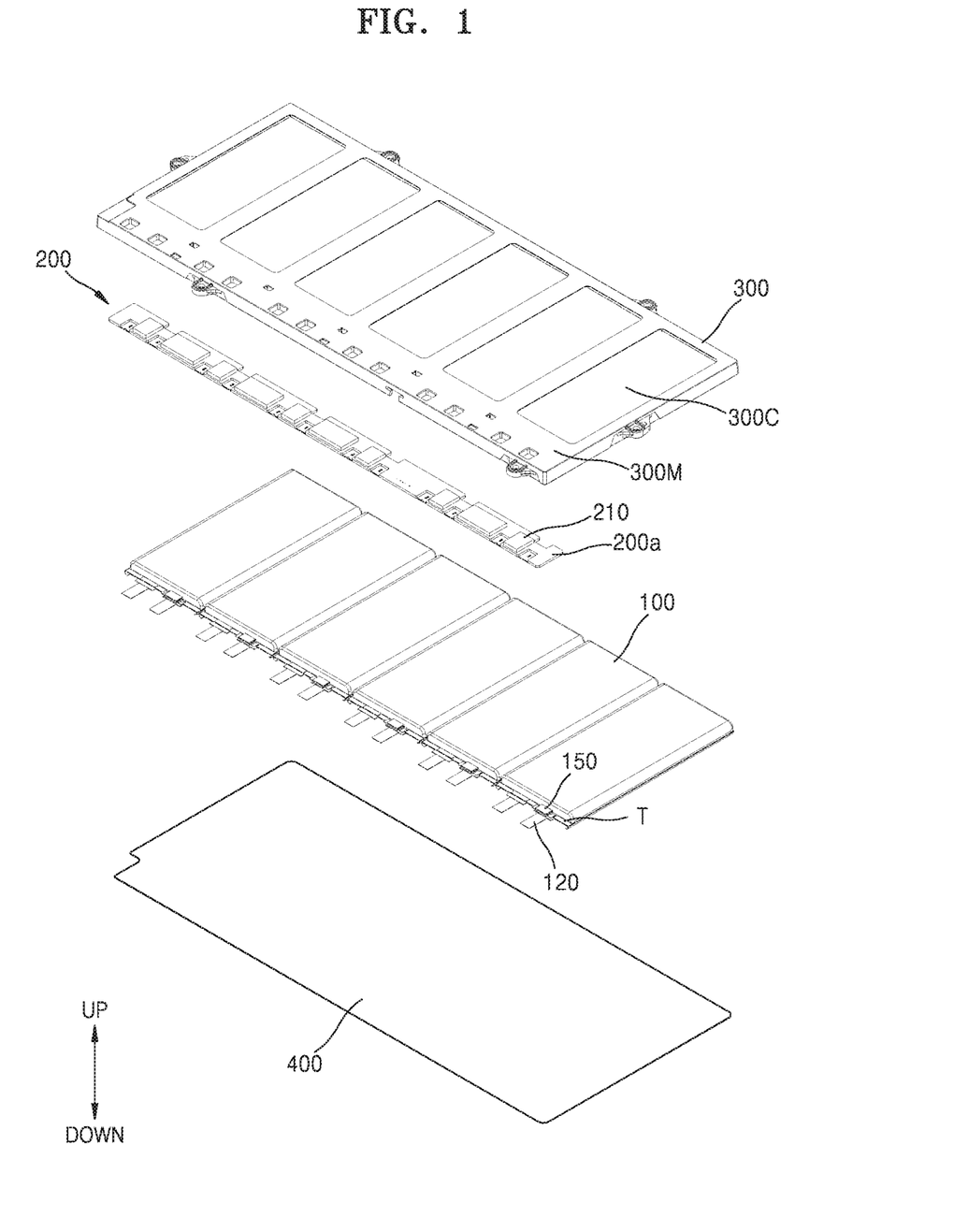
FIG. 1 is an exploded perspective view of a battery pack according to an embodiment of the present disclosure.

FIG. 1 is an exploded perspective view of a battery pack according to an embodiment of the present disclosure.

Referring to FIG. 1, the battery pack includes a battery cell 100 and a protection circuit module 200 electrically connected to the battery cell 100 to control a charge/discharge operation of the battery cell 100. Also, the battery pack may include a frame 300 for accommodating the battery cell 100 together with the protection circuit module 200, and a cover 400 coupled to the frame 300 to face the frame 300 to cover the battery cell 100 and the protection circuit module 200 accommodated in the frame 300.

The frame 300 may include a cell accommodating portion 300C in which the battery cell 100 is seated and a circuit accommodating portion 300M in which the protection circuit module 200 is seated at a position adjacent to the cell accommodating portion 300C. The protection circuit module 200 may extend in a direction crossing a plurality of battery cells 100 and form an electrical connection with each battery cell 100. The circuit accommodating portion 300M may be formed at a position facing or adjacent to a plurality of cell accommodating portions 300C where the plurality of battery cells 100 are respectively seated.

In an embodiment of the present disclosure, a plurality of the battery cells 100 may be provided, and the plurality of battery cells 100 may be electrically connected to each other through the protection circuit module 200. For example, the protection circuit module 200 includes a conductive pattern (not illustrated) electrically connected to each of the battery cells 100 to provide a charge/discharge path connected to each of the battery cells 100. The protection circuit module 200 may include a circuit board 200a and a conductive pattern (not illustrated) formed on the circuit board 200a, and may further include a plurality of circuit devices 210 mounted on the circuit board 200a.

The protection circuit module 200 may extend in a direction crossing a longitudinal (or height) direction of each of the plurality of battery cells 100 and form an electrical connection with each of the plurality of battery cells 100. For example, the protection circuit module 200 extends along a terrace portion T of the plurality of battery cells 100 and form an electrical connection with each electrode tab 120 drawn from the terrace portion T. Also, the protection circuit module 200 may collect the charge/discharge currents from each electrode tab 120 and transmit the same to an external circuit (not illustrated).

Figure 2:
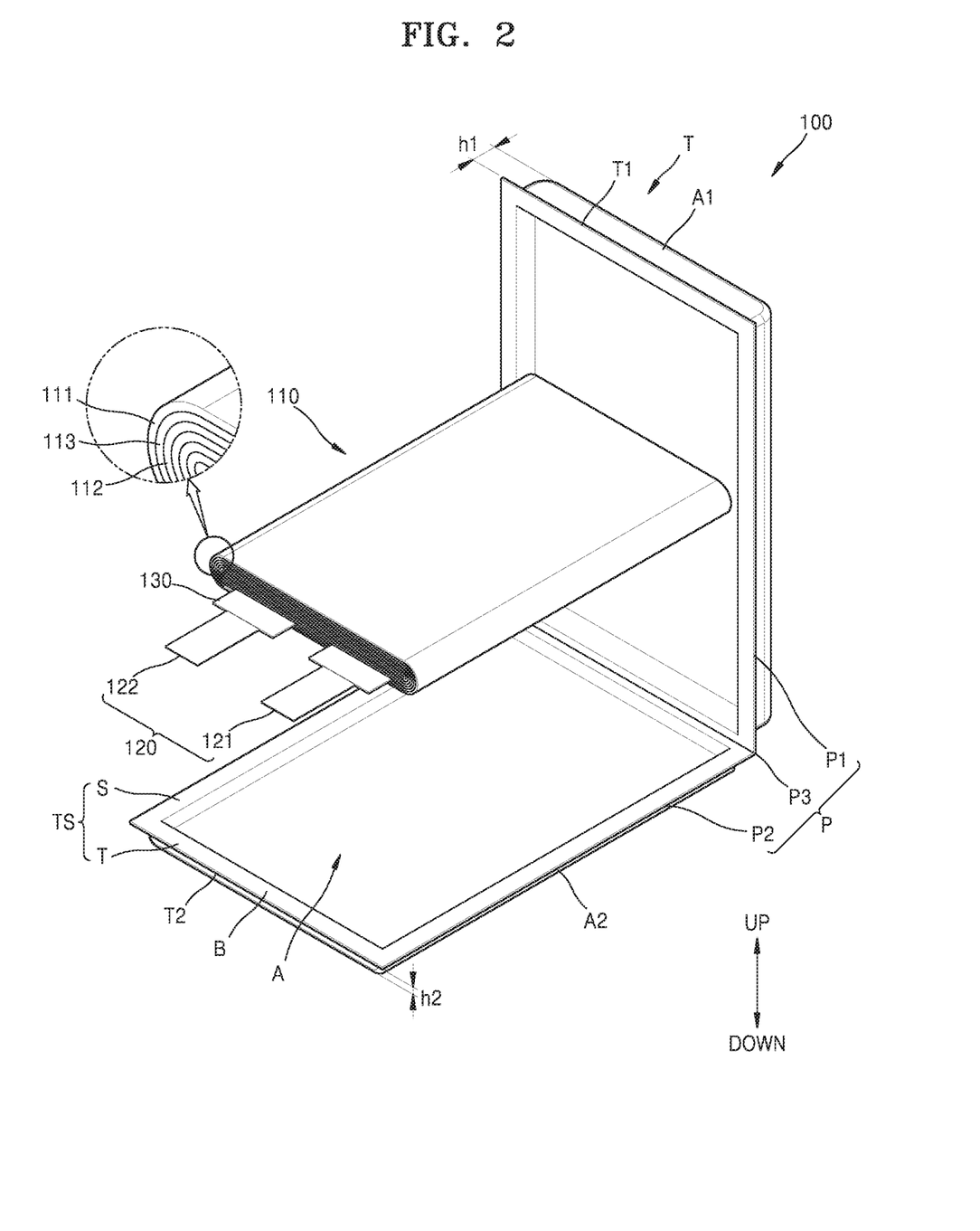
FIG. 2 is a perspective view illustrating a battery cell illustrated in FIG. 1.
Figure 3:
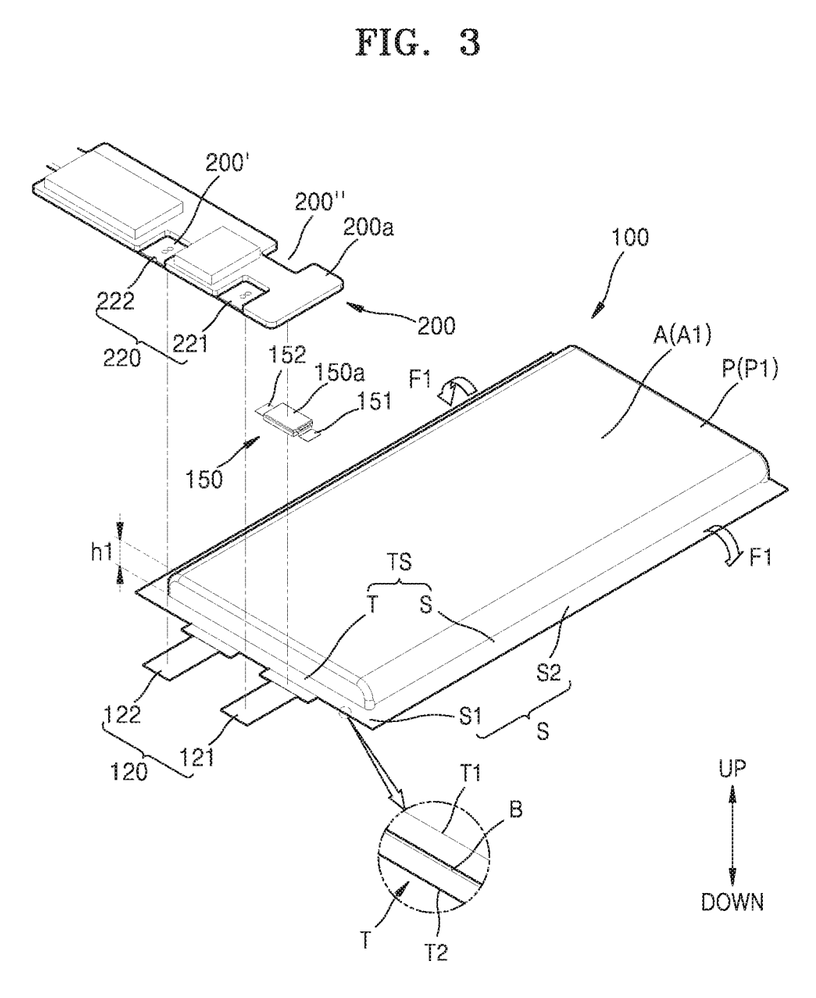
FIG. 3 is an exploded perspective view illustrating a portion of the battery pack illustrated in FIG. 1.
Figure 4:
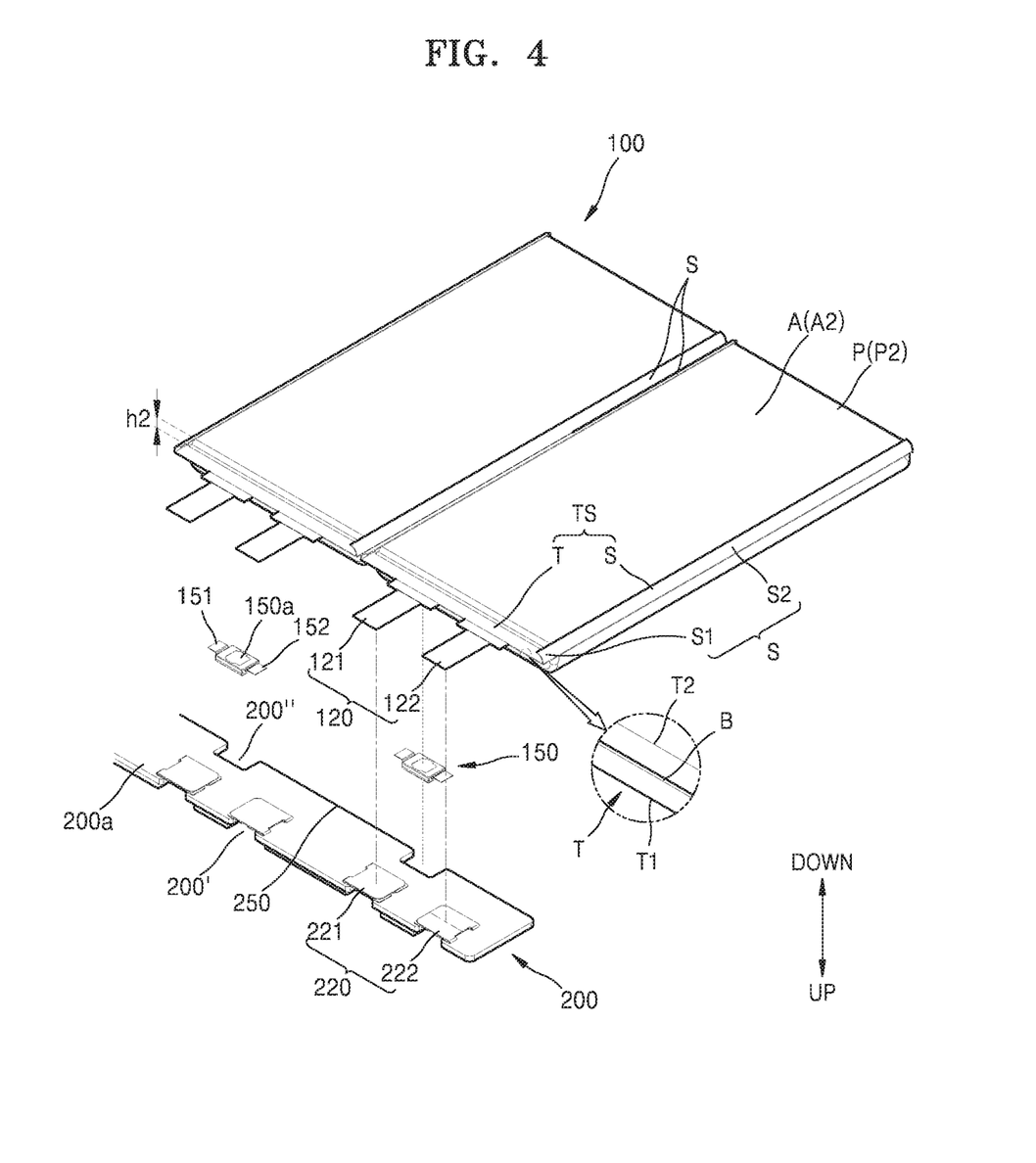
FIG. 4 is an exploded perspective view illustrating a portion of the battery pack illustrated in FIG. 3 from another direction.

FIG. 2 is a perspective view illustrating the battery cell illustrated in FIG. 1. FIG. 3 is an exploded perspective view illustrating a portion of the battery pack illustrated in FIG. 1. FIG. 4 is an exploded perspective view illustrating a portion of the battery pack illustrated in FIG. 3 seen from another direction.

The battery cell 100 may include an electrode assembly 110 and a case P sealing the electrode assembly 110. The electrode assembly 110 may include first and second electrode plates 111 and 112 having opposite polarities, and a separator 113 interposed between the first and second electrode plates 111 and 112. The first and second electrode plates 111 and 112 may be of a winding type, in which case they are wound in a roll form with the separator 113 interposed therebetween, or a plurality of first and second electrode plates 111 and 112 may be of a stack type, in which case they are stacked with the separator 113 interposed therebetween.

An electrode tab 120 may be connected to the electrode assembly 110. The electrode tab 120 may be drawn from a case P surrounding the electrode assembly 110, for example, from a terrace portion T of the case P. The electrode tab 120 may include first and second electrode tabs 121 and 122 having different polarities, and may be electrically connected to the first and second electrode plates 111 and 112 respectively. An insulating tape 130 may be attached to the electrode tab 120 to provide electrical insulation and sealing between the electrode tab 120 and the case P.

The case P may be a flexible case such as a pouch. The case P may include an insulating layer (not illustrated) formed on both sides of a thin-plate metal layer (not illustrated) such as aluminum, and may be formed through a forming process such as drawing.

The case P may include first and second cases P1 and P2 that are coupled to and face each other with the electrode assembly 110 interposed therebetween. The case P may include a hinge portion P3 that may be folded to overlap the first and second cases P1 and P2 with each other. The first and second cases P1 and P2 may be folded on the hinge portion P3 in opposite directions to overlap each other to form the case P accommodating the electrode assembly 110. For example, the first and second cases P1 and P2 may be coupled to and face each other with the electrode assembly 110 interposed therebetween to form together an accommodating portion A accommodating the electrode assembly 110 and a sealing portion TS sealing the accommodating portion A. The sealing portion TS may be formed along the periphery of the accommodating portion A to seal the accommodating portion A accommodating the electrode assembly 110. For example, the sealing portion TS may be formed along other side portions of the case P, other than the side portion of the case P where the hinge portion P3 is formed. In some embodiments, the first and second cases P1 and P2 of the case P may be coupled to each other to form an external appearance of a generally rectangular parallelepiped including a pair of short side portions facing each other and a pair of long side portions facing each other. In these embodiments, the sealing portion TS may be continuously formed along the pair of long side portions and the other short side portion other than the short side portion where the hinge portion P3 is formed.

The sealing portion TS may include a terrace portion T from which the electrode tab 120 electrically connected to the electrode assembly 110 is drawn, and a side sealing portion S contacting the terrace portion T and extending in a direction intersecting the terrace portion T. The terrace portion T may be formed on one short side portion of the case P, and the side sealing portion S may be formed on a pair of long side portions of the case P. The terrace portion T may extend in a direction intersecting the electrode tab 120 and seal the accommodating portion A, and the side sealing portion S may extend in a direction intersecting the terrace portion T and seal the accommodating portion A. The terrace portion T and the side sealing portion S may contact each other to form the sealing portion TS formed to extend continuously, and may seal the accommodating portion together.

The sealing portion TS may be formed by the first and second cases P1 and P2 coupled to overlap each other in opposite directions. The terrace portion T of the sealing portion TS may include an outer surface that is a combination of a first surface T1 on a first case P1 side and a second surface T2 on a second case P2 side and a sealing surface B that is an inner surface where the first case P1 and the second case P2 contact each other between the first surface T1 and the second surface T2.

Referring to FIG. 3, a protection circuit module 200 may be arranged on the terrace portion T, and the terrace portion T may provide a support base for the protection circuit module 200. The protection circuit module 200 arranged on the terrace portion T may form an electrical connection with the electrode tab 120 drawn from the terrace portion T.

When the first and second cases P1 and P2 are coupled to overlap each other, the terrace portion T and the side sealing portion S may extend widely along the periphery of the electrode assembly 110. Unlike the terrace portion T, in the case of the side sealing portion S not providing a support for the protection circuit module 200, by folding the side sealing portion S toward the accommodating portion A of the electrode assembly 110 (see F1 of FIG. 3), a structure that is suitable for achieving compactness of the entire battery pack while reducing the space occupied by the battery cell 100 may be provided. Furthermore, an electrical short circuit may be suppressed even when a metal layer (not illustrated) of the case P is exposed through a cross section of the side sealing portion S.

The side sealing portion S may include an end portion S1 contacting the terrace portion T and an extension portion S2 extending from the end portion S1. At the end portion S1, the side sealing portion S may contact the terrace portion T and may be connected to the terrace portion T. The entire sealing portion TS including the terrace portion T and the side sealing portion S may seal the accommodating portion A while extending along the periphery of the accommodating portion A. In this case, the terrace portion T extending along one short side portion of the case P and the side sealing portion S extending along a pair of mutually-facing long side portions of the case P may meet each other at an edge portion of the sealing portion TS, and the end portion S1 of the side sealing portion S may correspond to the edge portion of the sealing portion TS.

The side sealing portion S may be folded upward toward the first case P1 side or may be folded downward toward the second case P2 side (see F1 of FIG. 3). In the present disclosure, in order to avoid the interference with the protection circuit module 200, the side sealing portion S may be folded downward toward the second case P2 side. This will be described below in more detail.

Referring to FIG. 4, the protection circuit module 200 may be arranged on the first surface T1 of the terrace portion T. Also, in order to avoid the interference with the protection circuit module 200, the end portion S1 of the side sealing portion S may not protrude in a first surface T1 direction of the terrace portion T where the protection circuit module 200 is arranged. For example, the end portion S1 of the side sealing portion S is folded downward to protrude in a second surface T2 direction of the terrace portion T. That is, the end portion S1 of the side sealing portion S may not be folded to protrude in the first surface T1 direction of the terrace portion T facing the protection circuit module 200 but may be folded downward to protrude in the second surface T2 direction of the terrace portion T that is opposite to the first surface T1 direction of the terrace portion T. Herein, the first surface T1 direction of the terrace portion T may mean a facing direction of the first surface T1 of the terrace portion T in which the first surface T1 of the terrace portion T faces, and may mean an upward direction facing toward the protection circuit module 200 from the terrace portion T. Also, the second surface T2 direction of the terrace portion T may mean a facing direction of the second surface T2 of the terrace portion T in which the second surface T2 of the terrace portion T faces, and may mean a downward direction facing away from the protection circuit module 200 from the terrace portion T.

In the structure in which the protection circuit module 200 is arranged on the first surface T1 of the terrace portion T, if the end portion S1 of the side sealing portion S protrudes in the first surface T1 direction of the terrace portion T, that is, if the end portion S1 of the side sealing portion S is folded upward to protrude in the first surface T1 direction of the terrace portion T, it may cause a spatial interference between the protection circuit module 200 and the side sealing portion S (more particularly, the end portion S1). Also, in order to avoid the spatial interference between the protection circuit module 200 and the side sealing portion S (more particularly, the end portion S1), the protection circuit module 200 may need to be provided with an avoidance hole (not illustrated) for accommodating the side sealing portion S (more particularly, the end portion S1). A conductive pattern (not illustrated) for providing a charge/discharge path of the battery cell 100 may be formed in the protection circuit module 200. However, if an avoidance hole (not illustrated) is formed in the protection circuit module 200, the conductive pattern (not illustrated) may have to be formed to protrude in the width direction of the protection circuit module 200 in order to bypass the avoidance hole (not illustrated), and thus the width of the entire protection circuit module 200 may need to be increased.

In some embodiments, the protection circuit module 200 is arranged on the first surface T1 of the terrace portion T and the end portion S1 of the side sealing portion S is folded downward to protrude in the second surface T2 direction opposite to the first surface T1 direction of the terrace portion T facing the protection circuit module 200 in order to avoid the spatial interference with the protection circuit module 200. In these embodiments, the interference between the protection circuit module 200 and the end portion S1 of the side sealing portion S can be avoided and a spatial allocation such as an avoidance hole (not illustrated) is not required in the protection circuit module 200, and thus the area of the protection circuit module 200 can be relatively reduced and a battery pack can be made compact.

In some embodiments, the end portion S1 of the side sealing portion S may be folded downward to protrude in the second surface T2 direction of the terrace portion T opposite to the first surface T1 direction of the terrace portion T facing the protection circuit module 200. The end portion S1 of the side sealing portion S may be folded through primary folding F1 for folding the entire side sealing portion S toward the accommodating portion A. That is, the end portion S1 and the extension portion S2 of the side sealing portion S may be folded together through the primary folding F1. Also, the end portion S1 and the extended portion S2 of the side sealing portion S may all be folded downward in parallel in the second surface T2 direction of the terrace portion T. The end portion S1 of the side sealing portion S may not be folded to overlap onto the second surface T2 of the terrace portion T. Unlike in the embodiment of FIG. 5 described below, since secondary folding for folding the end portion S1 of the side sealing portion S toward the terrace portion T may not be required, the process operations thereof may be reduced.

Referring to FIG. 2, the first and second cases P1 and P2 may respectively include first and second accommodating portions A1 and A2 accommodating different portions of the electrode assembly 110, and the first and second cases P1 and P2 may be coupled to each other to provide the accommodating portion A for sufficiently accommodating the electrode assembly 110. For example, the accommodating portion A of the electrode assembly 110 may be formed by connecting the first and second accommodating portions A1 and A2 of the first and second cases P1 and P2 to each other. For example, the first accommodating portion A1 may accommodate one portion of the electrode assembly 110, and the second accommodating portion A2 may accommodating the other portion of the electrode assembly 110.

In some embodiments, the first and second accommodating portions A1 and A2 may be formed to different thicknesses h1 and h2. Herein, the thicknesses h1 and h2 of the first and second accommodating portions A1 and A2 may be measured along the thickness direction of the electrode assembly 110 and may be measured from the first surface T1 and the second surface T2 of the terrace portion T, respectively. Since the thickness h1 of the first accommodating portion A1 is formed to be larger than the thickness h2 of the second accommodating portion A2, the volume of the first accommodating portion A1 may be formed to be larger than the volume of the second accommodating portion A2 and the first accommodating portion A1 may accommodate a larger volume than the second accommodating portion A2.

Since the thickness h1 of the first accommodating portion A1 is greater than the thickness h2 of the second accommodating portion A2, the relatively-thick protection circuit module 200 may be arranged on the first surface T1 of the terrace portion T and the relatively-thin side sealing portion S (for example, the end portion S1 of the side sealing portion S) may be folded to protrude on the second surface T2 of the terrace portion T. As such, since the protection circuit module 200 and the side sealing portion S are dispersed such that the protection circuit module 200 and the side sealing portions S (the end portion S1) having different thicknesses protrude from on the first surface T1 and the second surface T2 of the terrace portion T, the protection circuit module 200 and the side sealing portion S may not form a remarkable thickness larger than the thicknesses h1 and h2 of the first and second accommodating portions A1 and A2 and the slimness of the entire battery pack may be implemented. In other embodiments, the protection circuit module 200 may be arranged on the second surface T2 of the terrace portion T. In these embodiments, the end portion S1 of the side sealing portion S may be folded to overlap the first surface T1 of the terrace portion T or folded to protrude in a first surface direction of the terrace portion T. Furthermore, the thickness h2 may be greater than h1. In other embodiments, the end portion S1 of the side sealing portion S may be folded or bent in other directions or configurations such that the end portion S1 of the side sealing portion S does not spatially interfere with, intersect or physical block the prosecution circuit module 200.

Referring to FIG. 4, the protection circuit module 200 may extend across the side sealing portions S of different battery cells 100. In this case, since the side sealing portion S may protrude from on the second surface T2 opposite to the first surface T1 of the terrace portion T where the protection circuit module 200 is arranged, a separate avoidance hole (not illustrated) for accommodating the side sealing portion S is not required in the protection circuit module 200. The protection circuit module 200 may include a transverse portion 250 that extends across a plurality of different battery cells 100 and extends across the side sealing portions S of different battery cells 100. In this case, since a separate avoidance hole (not illustrated) for accommodating the side sealing portion S may not be provided in the transverse portion 250 of the protection circuit module 200, it may have a flat side surface where a configuration such as a hole or groove is not formed. In some embodiments, the battery cell 100 side of the transverse portion 250 of the protection circuit module 200 extending across the side sealing portions S of different battery cells 100, that is, the side surface of the transverse portion 250 facing the accommodating portions A of different battery cells 100 may include a flat surface. Since the side surface of the transverse portion 250 includes a flat surface, there is no need for a configuration such as a hole or groove for accommodating the side sealing portion S.

A current interrupting device 150 may be arranged on the first surface T1 of the terrace portion T together with the protection circuit module 200. The current interrupting device 150 may limit or interrupt the charge/discharge path of the battery cell 100 when the battery cell 100 malfunctions, such as overheating. For example, the current interrupting device 150 may be connected to the charge/discharge path of the battery cell 100 to interrupt the path of the charge/discharge current or suppress the charge/discharge current according to the temperature of the battery cell 100. The current interrupting device 150 may be arranged on the first surface T1 of the terrace portion T in order to be sensitive to the temperature of the battery cell 100. Also, the current interrupting device 150 may be electrically connected to the protection circuit module 200 in order to be connected to the charge/discharge path of the battery cell 100 to limit or interrupt the charge/discharge path. That is, the current interrupting device 150 may be interposed between the protection circuit module 200 and the first surface T1 of the terrace portion T to be thermally connected to the battery cell 100 and to be electrically connected to the protection circuit module 200.

Since the protection circuit module 200 and the current interrupting device 150 are arranged together on the first surface T1 of the terrace portion T, a mounting hole 200" for mounting the current interrupting device 150 may be formed in the protection circuit module 200 in order to avoid the spatial interference therebetween. In some embodiments, the mounting hole 200" of the protection circuit module 200 may be formed in the side surface of the protection circuit module 200 facing the accommodating portion A of the battery cell 100. For example, the mounting hole 200" may be formed in the side surface of the protection circuit module 200 facing the accommodating portion A of the battery cell 100. In some embodiments, among the side surface of the protection circuit module 200, the mounting hole 200" may be formed at a position between the first and second electrode tabs 121 and 122, inclusive of the position of the first and second electrode tabs 121 and 122 of the battery cell 100. The current interrupting device 150 may be formed at a position between the first and second electrode tabs 121 and 122 (inclusive of the position of the first and second electrode tabs 121 and 122) among the first surface T1 of the terrace portion T to detect the overheating of the battery cell 100 through the first and second electrode tabs 121 and 122.

As described above, among the side surface of the protection circuit module 200, the side surface of the transverse portion 250 may be formed to be flat without having a structure such as a hole or groove. This is because the transverse portion 250 may extend across the side sealing portions S of different battery cells 100 and an avoidance hole (not illustrated) for accommodating the side sealing portions S is not required in the transverse portion 250 in some embodiments. Thus, the interference between the protection circuit module 200 and the side sealing portions S can be fundamentally prevented. More particularly, the transverse portion 250 may extend across the side sealing portions S of different battery cells 100 at positions deviating from the first and second electrode tabs 121 and 122, that is, at positions outside a pair of first and second electrode tabs 121 and 122, and may have a flat surface not including a hole or groove, unlike the mounting hole 200" formed at a position between the first and second electrode tabs 121 and 122.

The current interrupting device 150 may include a main body 150a including a variable resistor providing a variable resistance according to temperature, and first and second leads 151 and 152 electrically connected through the main body 150a. The main body 150a may be accommodated in the mounting hole 200" of the protection circuit module 200 on the first surface T1 of the terrace portion T. The first and second leads 151 and 152 may overlap the protection circuit module 200 around the mounting hole 200" and may be electrically connected to the protection circuit module 200. The current interrupting device 150 is not limited to the above-described configuration, may have any structure as long as the charge/discharge current may be limited or interrupted according to the temperature of the battery cell 100, and may include a thermal cutoff (TCO), a positive temperature coefficient (PTC), a fuse, or the like.

The protection circuit module 200 may be arranged on the first surface T1 of the terrace portion T. For example, the protection circuit module 200 may be arranged on the first surface T1 of the terrace portion T and may be arranged on the electrode tab 120 drawn from the terrace portion T, to form an electrical connection with the electrode tab 120. In this case, the protection circuit module 200 may include a connection tab 220 that overlaps the electrode tab 120 at the position of each electrode tab 120 and forms an electrical connection therewith. The connection tab 220 may include first and second connection tabs 221 and 222 that form electrical connections with the first and second electrode tabs 121 and 122 respectively. The connection tab 220 may be welded to the electrode tab 120 while being overlapped with the electrode tab 120, and for this purpose, the connection tab 220 may be exposed outside through a coupling hole 200' of the protection circuit module 200. While being overlapped with each other, the connection tab 220 and the electrode tab 120 may be exposed outside the protection circuit module 200 through the coupling hole 200' and may be laser-welded to each other through laser irradiation.

Figure 5:
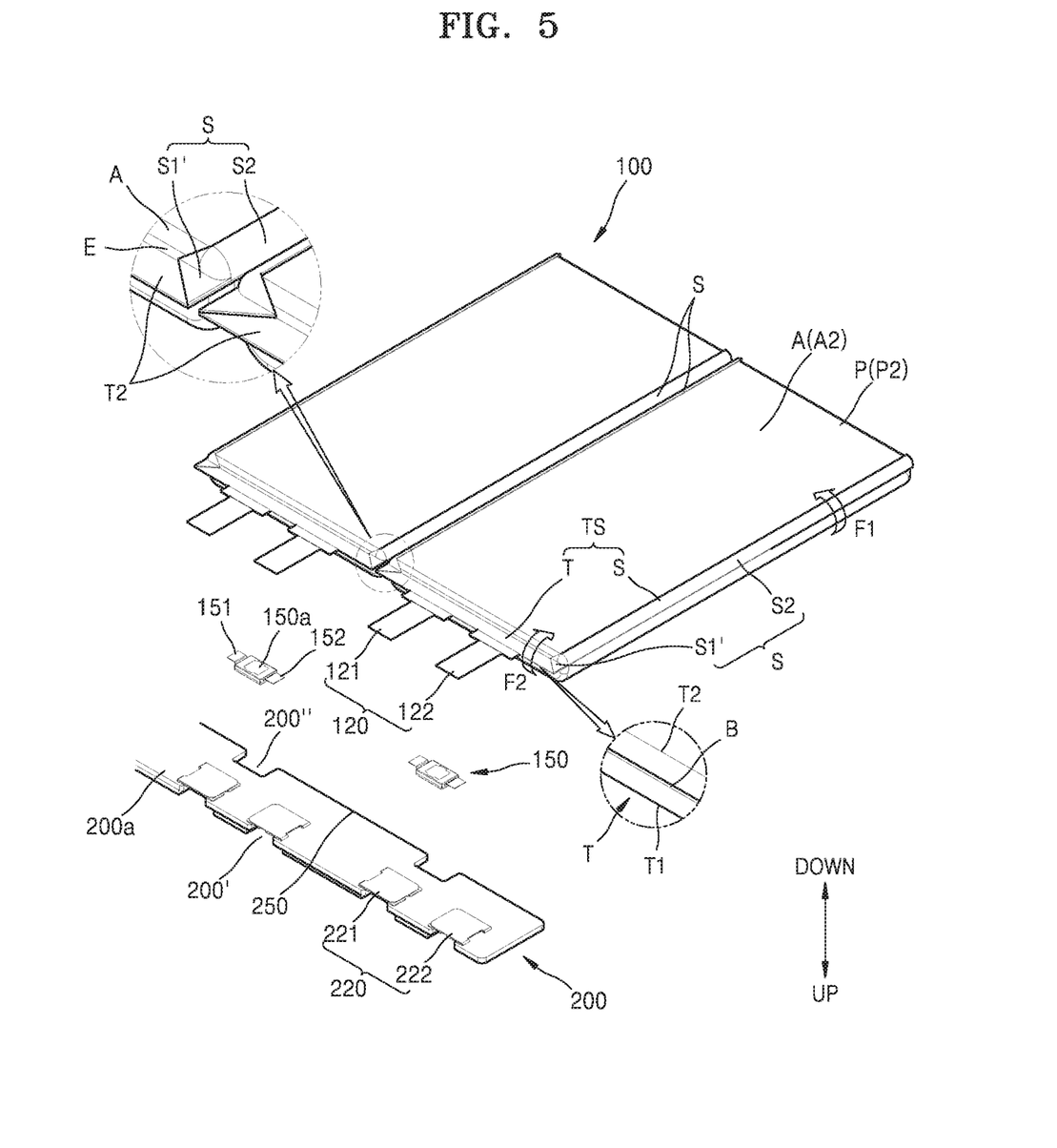
FIG. 5 illustrates a modified embodiment of FIG. 4 as a portion of a battery pack according to another embodiment of the present disclosure.

FIG. 5 illustrates a modified embodiment of FIG. 4 as a portion of a battery pack according to another embodiment of the present disclosure.

Referring to FIG. 5, the protection circuit module 200 may be arranged on the first surface T1 of the terrace portion T. Also, an end portion S1' of the side sealing portion S may be folded to overlap onto the second surface T2 of the terrace portion T. That is, the end portion S1' of the side sealing portion S may not be arranged on the first surface T1 of the terrace portion T1 where the protection circuit module 200 is arranged, and may be folded to overlap onto the second surface T2 of the terrace portion T opposite to the first surface T1 of the terrace portion T.

In the structure in which the protection circuit module 200 is arranged on the first surface T1 of the terrace portion T, if the end portion S1' of the side sealing portion S is folded to overlap onto the first surface T1 of the terrace portion T, it may cause a spatial interference between the protection circuit module 200 and the end portion S1' of the side sealing portion S and an avoidance hole (not illustrated) for accommodating the end portion S1' of the side sealing portion S is required in the protection circuit module 200 in order to avoid the spatial interference between the protection circuit module 200 and the end portion S1' of the side sealing portion S. A conductive pattern (not illustrated) for providing a charge/discharge path of the battery cell 100 may be formed in the protection circuit module 200. However, if an avoidance hole (not illustrated) is formed in the protection circuit module 200, the conductive pattern (not illustrated) may have to be formed to protrude in order to bypass the avoidance hole (not illustrated), and thus the width of the entire protection circuit module 200 may need to be increased.

In some embodiments, the protection circuit module 200 is arranged on the first surface T1 of the terrace portion T1 and the end portion S1' of the side sealing portion S is folded onto the second surface T2 of the terrace portion T opposite to the first surface T1 where the protection circuit module 200 is arranged, in order to avoid the spatial interference with the protection circuit module 200. Thus, the interference between the protection circuit module 200 and the end portion S1' of the side sealing portion S may be avoided and a spatial allocation such as an avoidance hole (not illustrated) is not required in the protection circuit module 200, resulting in a reduced area of the protection circuit module 200 and compactness of a battery pack. Also, even when a metal layer (not illustrated) is exposed through a cross section of the side sealing portion S (more particularly, the end portion S1'), an electrical interference between the side sealing portion S (more particularly, the end portion S1') and the protection circuit module 200 may be avoided. That is, an electrical short circuit between the case P and the protection circuit module 200 may be prevented.

In some embodiments, the end portion S1' of the side sealing portion S may be folded toward the terrace portion T. That is, the end portion S1' and the extension portion S2 of the side sealing portion S may be folded onto different side portions of the accommodating portion A, respectively. For example, the extension portion S2 of the side sealing portion S may overlap onto a long side portion of the accommodating portion A, and the end portion S1' of the side sealing portion S may overlap onto a short side portion of the accommodating portion A. That is, the end portion S1' of the side sealing portion S and the extension portion S2 of the side sealing portion S may be folded in different forms. This type of side sealing portion S may be formed by folding (i.e., primary folding F1) the entire side sealing portion S toward the accommodating portion A of the electrode assembly 110 and folding (i.e., secondary folding F2) the end portion S1' of the side sealing portion S toward the terrace portion T. For example, the extension portion S2 of the side sealing portion S may be folded through primary folding F1 for folding the entire side sealing portion S toward the accommodating portion A. Also, the end portion S1' of the side sealing portion S may be folded toward the terrace portion T through the primary folding F1 and secondary folding F2 after the primary folding F1.

That is, unlike the extended portion S2 folded toward the accommodating portion A through primary folding F1, the end portion S1' of the side sealing portion S may be folded toward the terrace portion T through secondary folding F2 after the first folding F1. In this case, in order to prevent the spatial interference with the protection circuit module 200 arranged on the first surface T1 of the terrace portion T, the end portion S1' of the side sealing portion S may be folded onto the second surface T2 of the terrace portion T, not onto the first surface T1 of the terrace portion T where the protection circuit module 200 is arranged.

While the end portion S1' of the side sealing portion S is folded toward the terrace portion T, the end portion S1' of the side sealing portion S may be folded onto the second surface T2 of the terrace portion T and the accommodating portion A while being folded concavely toward an edge E where the second surface T2 of the terrace portion T and the accommodating portion A contact each other. That is, in the secondary folding F2, the end portion S1' of the side sealing portion S may be folded onto the second surface T2 of the terrace portion T and the accommodating portion A while being folded concavely toward an edge E of the case P where the second surface T2 of the terrace portion T and the accommodating portion A contact each other.

The extension portion S2 of the side sealing portion S may be folded downward in a second surface T2 direction of the terrace portion S2 in order for the end portion S1' of the side sealing portion S to be folded to overlap onto the second surface T2 of the terrace portion T. Herein, the second surface T2 direction may mean a facing direction of the second surface T2 of the terrace portion T, for example, a downward direction opposite to a direction toward the protection circuit module 200. The end portion S1' of the side sealing portion S may be folded onto the second surface T2 of the terrace portion T through the primary folding F1 and the secondary folding F2, and the folding direction in the primary folding F1 may be set to the second surface T2 direction of the terrace portion T in order for the end portion S1' of the side sealing portion S to overlap on the second surface T2 of the terrace portion T. That is, in the primary folding F1, the extension portion S2 of the side sealing portion S may be folded in the second surface T2 direction of the terrace portion T.

In the present embodiment, unlike in the embodiment illustrated in FIG. 4, since the end portion S1' of the side sealing portion S may be folded to overlap onto the second surface T2 of the terrace portion T, the end portion S1' of the sealing portion S may be stably folded on the second surface T2 of the terrace portion T, and since the position of the end portion S1' of the sealing portion S may be firmly fixed and a floating such as a flutter may be prevented therein, a suitable structure for avoiding the physical/electrical interference with other peripheral configurations may be provided.

Figure 6:
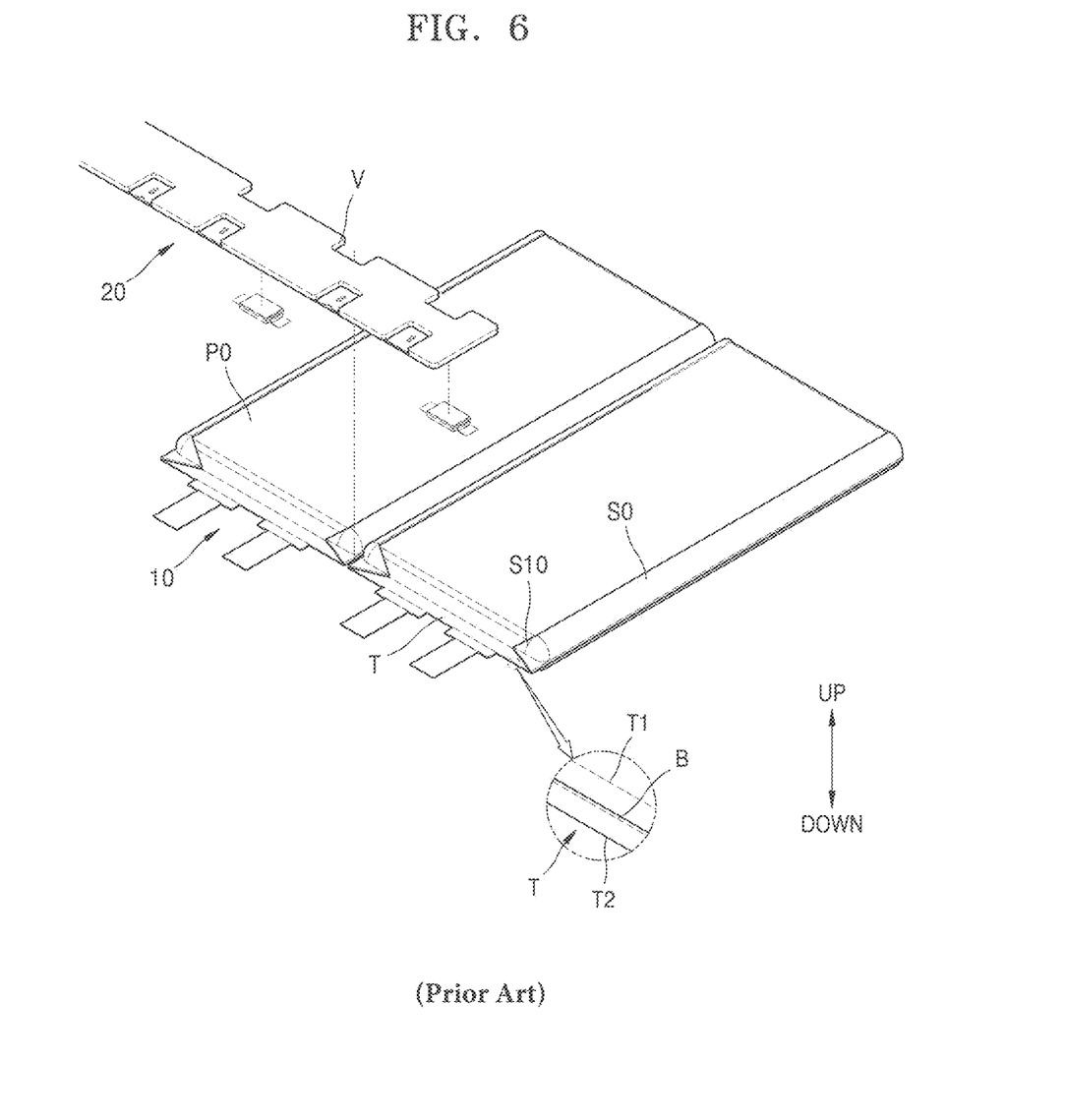
FIG. 6 illustrates a battery pack according to a comparative example with the present disclosure.

FIG. 6 illustrates a portion of a battery pack according to a comparative example in comparison with the present disclosure.

Referring to FIG. 6, a battery pack according to a comparative example may include a plurality of different battery cells 10 and a protection circuit module 20 extending across the plurality of battery cells 10 to form an electrical connection with each battery cell 10. The protection circuit module 20 may be arranged on a first surface T1 of a terrace portion T, and an end portion S10 of a side sealing portion S0 may be folded onto the first surface T1 of the terrace portion T where the protection circuit module 20 is arranged. That is, in the battery pack according to the comparative example, the end portion S10 of the side sealing portion S0 may be folded to overlap on the first surface T1 of the terrace portion T where the protection circuit module 20 is arranged. According to the comparative example, in order to prevent a spatial interference between the end portion S10 of the side sealing portion S0 and the protection circuit module 20, an avoidance hole V for accommodating the end portion S10 of the side sealing portion S0 is formed in the protection circuit module 20 and a conductive pattern (not illustrated) of the protection circuit module 20 may be designed to bypass the avoidance hole V.

As such, in the comparative example, since the avoidance hole V is formed in the protection circuit module 20 in consideration of the interference with the end portion S10 of the side sealing portion S0, the effective area of the protection circuit module 20 may be reduced and restricted correspondingly and thus the width of the protection circuit module 20 may need to be increased correspondingly. For example, the protection circuit module 20 may include a conductive pattern (not illustrated) formed on a circuit board to form a charge/discharge path of the battery cell 10. However, when the conductive pattern (not illustrated) is formed to protrude in the width direction in order to bypass the avoidance hole V, the width of the entire protection circuit module 20 may need to be increased by the width corresponding to the avoidance hole V, which may mean that the size of the entire battery pack is increased. Also, a metal layer (not illustrated) may be exposed through a cross section of the side sealing portion S0. However, since the metal layer (not illustrated) is arranged in the avoidance hole V of the protection circuit module 20, it may cause an electrical interference with the protection circuit module 20. That is, an electrical short circuit may occur between a metal layer (not illustrated) of a case P0 and the protection circuit module 20.

In some embodiments, since the end portion S1 or S1' of the side sealing portion S is folded to overlap onto the second surface T2 of the terrace portion T or protrude in the second surface T2 direction instead of being arranged on the first surface T1 of the terrace portion T where the protection circuit module 200 is arranged, a separate avoidance hole is not required in the protection circuit module 200 in order to avoid the spatial interference with the side sealing portion S, and since a conductive pattern (not illustrated) of the protection circuit module 200 does not need to be designed to bypass the avoidance hole, the width of the protection circuit module 200 may be reduced correspondingly and a battery pack having an overall compact structure may be provided. Also, in some embodiments, since the end portion S1 or S1' of the side sealing portion S is folded to overlap onto the second surface T2 of the terrace portion T or protrude in the second surface T2 direction instead of being arranged on the first surface T1 of the terrace portion T where the protection circuit module 200 is arranged, not only the spatial interference with the protection circuit module 200 but also the electrical interference therewith can be fundamentally prevented. That is, the electrical short circuit between the case P and the protection circuit module 200 may be fundamentally prevented.

According to at least some embodiments of the present disclosure, since the sealing portion of the battery cell and the protection circuit module forming the charge/discharge path of the battery cell are respectively dispersed to protrude from opposite surfaces of the terrace portion, a spatial interference between the sealing portion of the battery cell and the protection circuit module may be fundamentally avoided. Thus, a configuration such as a separate hole or groove is not required in the protection circuit module in order to avoid the interference with the sealing portion of the battery cell, and the width of the protection circuit module may be reduced and a battery pack having an overall compact structure may be provided.

Although the present disclosure has been described with reference to the embodiments illustrated in the drawings, this is merely an example and those of ordinary skill in the art will understand that various modifications and other equivalent embodiments may be derived therefrom. Thus, the spirit and scope of the present disclosure should be defined by the appended claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A battery pack comprising a battery cell and a protection circuit module, wherein the battery cell comprises:
   an electrode assembly to which an electrode tab is connected; and
   first and second cases coupled to face each other to form an accommodating portion accommodating the electrode assembly and a sealing portion sealing the accommodating portion,
   wherein the sealing portion comprises:
   a terrace portion extending across the electrode tab and comprising a first surface on the first case and a second surface on the second case, wherein the protection circuit module is arranged on the first surface of the terrace portion; and
   a side sealing portion comprising an end portion contacting the terrace portion and an extension portion connected to and extending away from the end portion,
   wherein the end portion of the side sealing portion is folded to overlap the second surface of the terrace portion or folded to protrude in a second surface direction of the terrace portion so as not to spatially interfere with the protection circuit module arranged on the first surface of the terrace portion, and
   wherein the end portion of the side sealing portion is arranged on the second surface of the terrace portion opposing the first surface such that the end portion of the side sealing portion and the protection circuit module are arranged on opposing sides of the terrace portion.

2. The battery pack of claim 1, wherein the end portion of the side sealing portion is folded to protrude in the second surface direction that is a facing direction of the second surface of the terrace portion.

3. The battery pack of claim 2, wherein the end portion of the side sealing portion is folded to protrude in the second surface direction so as not to overlap the second surface of the terrace portion.

4. The battery pack of claim 2, wherein the end portion and the extension portion of the side sealing portion are folded substantially in parallel to protrude in the second surface direction of the terrace portion.

5. The battery pack of claim 1, wherein the end portion of the side sealing portion is folded concavely toward an edge where the second surface of the terrace portion and the accommodating portion contact each other to overlap the second surface of the terrace portion and the accommodating portion.

6. The battery pack of claim 5, wherein the end portion and the extension portion of the side sealing portion are folded to overlap different side portions of the accommodating portion.

7. The battery pack of claim 1, wherein the end portion of the side sealing portion does not overlap the first surface of the terrace portion where the protection circuit module is arranged or protrude in a first surface direction.

8. The battery pack of claim 1, wherein the first and second cases respectively comprise first and second accommodating portions respectively accommodating upper and lower portions of the electrode assembly.

9. The battery pack of claim 8, wherein the first accommodating portion is thicker than the second accommodating portion.

10. The battery pack of claim 1, wherein the battery cell comprises a plurality of battery cells, and wherein the protection circuit module extends across the plurality of battery cells and forms an electrical connection with each of the plurality of battery cells.

11. The battery pack of claim 10, wherein the protection circuit module extends along a terrace portion of the plurality of battery cells and forms an electrical connection with an electrode tab drawn from a terrace portion of each of the plurality of battery cells.

12. The battery pack of claim 11, wherein the electrode tab comprises first and second electrode tabs having different polarities, and wherein the first and second electrode tabs are drawn from the terrace portion and connected to the protection circuit module.

13. The battery pack of claim 12, wherein the protection circuit module comprises first and second connection tabs that are coupled to respectively overlap the first and second electrode tabs drawn from the terrace portion.

14. The battery pack of claim 12, wherein the protection circuit module comprises a transverse portion extending across a side sealing portion of different battery cells, and wherein a side surface of the transverse portion facing an accommodating portion of different battery cells comprises a flat surface.

15. The battery pack of claim 12, wherein a mounting hole configured to mount a current interrupting device is formed in a side surface of the protection circuit module facing an accommodating portion of the battery cell.

16. The battery pack of claim 15, wherein the mounting hole is formed at a position between the first and second electrode tabs, inclusive of a position of the first and second electrode tabs.

17. The battery pack of claim 15, wherein the current interrupting device comprises a main body and first and second leads connected to each other through the main body, and wherein the main body is accommodated in the mounting hole.

18. The battery pack of claim 15, wherein the current interrupting device is connected to a charge/discharge path of the battery cell to limit or interrupt the charge/discharge path when the battery cell malfunctions.

19. A battery pack comprising:
   a battery cell; and
   a protection circuit module configured to control charge/discharge operations of the battery cell, wherein the battery cell comprises:

an electrode assembly;

an electrode tab outwardly extending in a first direction from the electrode assembly; and first and second half cases coupled to each other to form a case, wherein the case includes an accommodating space accommodating the electrode assembly and a sealing portion outwardly extending from and sealing the accommodating space, wherein the sealing portion comprises:

a terrace portion extending in a second direction crossing the first direction and comprising a first surface on the first half case and a second surface on the second half case; and a side sealing portion comprising an end contacting the terrace portion and an extension connected to and extending away from the end, wherein the protection circuit module is arranged on the first or second surface of the terrace portion, wherein the end of the side sealing portion is folded in a direction away from the protection circuit module so as not to spatially interfere with the protection circuit module arranged on one of the first or second surface of the terrace portion, and wherein the end portion of the side sealing portion is arranged on the other of the first or second surface of the terrace portion opposing the one surface such that the end portion of the side sealing portion and the protection circuit module are arranged on opposing sides of the terrace portion.

20. The battery pack of claim 19, wherein the end of the side sealing portion is folded to overlap one of the second or first surface of the terrace portion where the protection circuit module is not arranged or the end of the side sealing portion is folded to protrude in a direction toward one of the second and first half cases where the protection circuit module is not arranged.

21. The battery pack of claim 1, wherein the protection circuit module has no avoidance hole configured to accommodate the end portion of the side sealing portion.

* * * * *